Inventor
Philippe Darrasse
By Littlepage & Quaintance
Att'ys.

Inventor
Philippe Darrasse
By Littlepage & Quaintance
Attys.

United States Patent Office
3,435,158
Patented Mar. 25, 1969

3,435,158

TELEPHONE HANDSET HOLDER

Philippe Darrasse, 21 Chemin des Buttes, L'Etang-la-Ville, Yvelines, France

Filed Dec. 13, 1965, Ser. No. 513,274
Claims priority, application France, Dec. 14, 1964, 998,509
Int. Cl. H04m 1/04
U.S. Cl. 179—157 4 Claims

ABSTRACT OF THE DISCLOSURE

Telephone handset holders having rigid arcuate supports of expanded plastics shaped to fit a shoulder of a user and having a relatively narrow middle portion and wider end portions below the middle portion, having pins extending upward from the middle portion and opposed clamping plates attached to the top of the pins for holding a telephone in the vicinity of but spaced from the face of the user are described herein.

The present invention relates, as a novel industrial product, to a device adapted to hold a telephone handset or a small radio set on the shoulder of the user, without using the hand.

Telephone receivers as presently provided do not allow the users to telephone "hands free," since they are forced to hold the handset with one hand.

Therefore, during a telephone conversation, if they desire to take notes, or consult documents etc., the users are forced to assume uncomfortable positions and try for instance to maintain the handset in a convenient position by trying to wedge it between the shoulder and the ear under a highly inclined head position.

The present invention has for its object to eliminate these drawbacks, by allowing the user to telephone hands free, while being able to move about—within the limits of the wire connecting the set—by means of a device of simple, reliable and economical construction.

The device according to the invention consists essentially of a support counter-shaped as a shoulder and adapted to adjust itself thereto, said support being such as to receive a telephone handset with its earphone placed facing the user's ear and the mouth-piece close to his mouth; the device may as well be adapted to a small radio set.

The invention will be best understood from the following description and appended drawings, in which.

Figure 1:
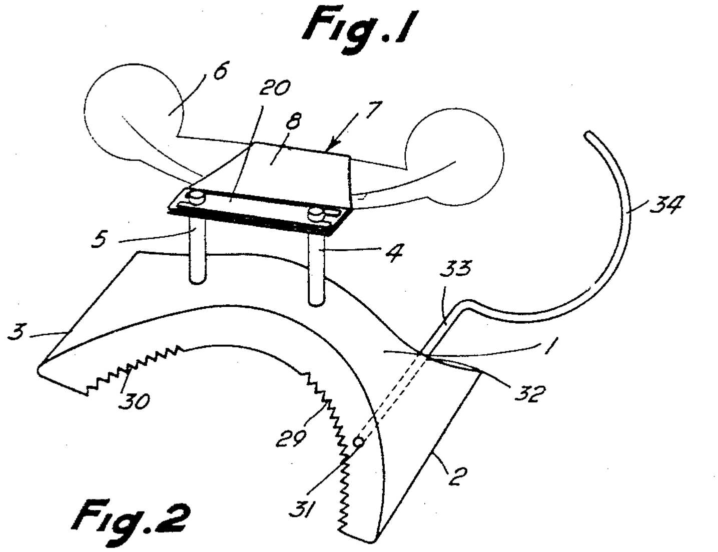
FIG. 1 illustrates the unit comprising the telephone handset and its support, in the utilization position.
Figure 2:
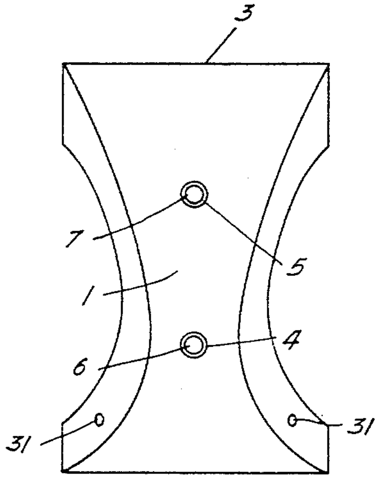
FIG. 2 is a top view of the support.
Figure 3:
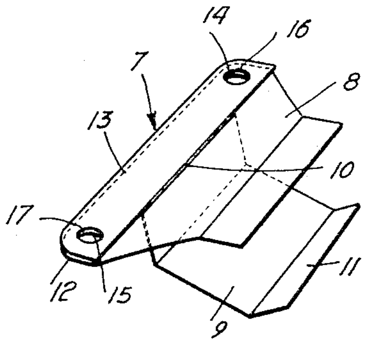
FIG. 3 is a perspective view of a supporting clamp of the handset.
Figure 4:
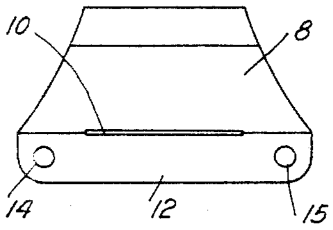
FIG. 4 is a top view of the upper jaw of said clamp.

Referring now to FIGURES 1 to 3 of the drawing, the support 1 is shown to consist of a mounting plate, for instance of an expanded rigid plastic material, of such a shape as to be able to engage the shoulder of the user. A support member of convenient width and length is formed with two widened end portions 2 and 3 and narrowed in its center.

Figure 5:
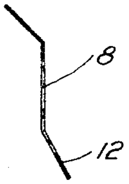
FIG. 5 illustrates a side view of the upper jaw of the clamp.
Figure 6:
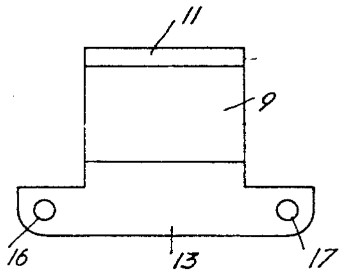
FIG. 6 is a top view of the lower jaw of the clamp.
Figure 7:
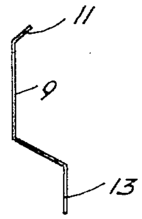
FIG. 7 is a side view of the lower jaw of the clamp.

At the upper end of the support member are provided two rods 4 and 5 secured as by screwing or integrally therewith on casting, spaced about 10 cm. of each other along the longitudinal axis of the support. A telephone handset 6 is solidly maintained on said rods 4 and 5 by means of a clamp 7 formed with an upper jaw 8 of shaped metal (FIG. 5) and with a slot 10 for inserting the end portion 11 of a lower jaw 9 shaped as illustrated in FIGURE 7, up to the point where flat portions 12 and 13, respectively, face each other.

Figure 8:
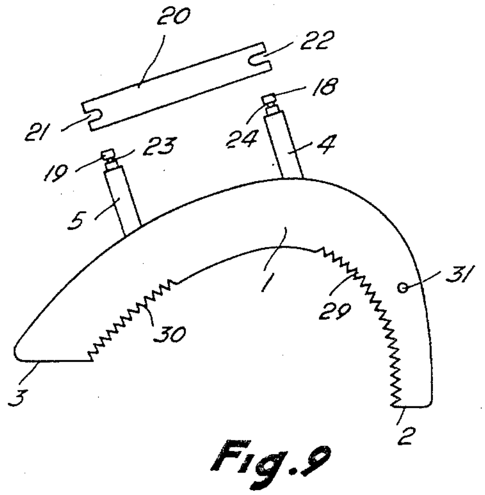
FIG. 8 is a side view of the support.

The flat portion 12 of the upper jaw is formed with holes 14 and 15 which may be caused to coincide, respectively, with holes 16 and 17 formed in the flat portion 13 of the lower jaw, by applying against one another each of said two flat portions. The diameter of said holes is slightly greater than that of the heads 18 and 19 of rods 4 and 5, as shown in FIGURE 8. It is thus possible to apply clamp 7 onto support member 1 by causing heads 18 and 19 to be inserted into the corresponding holes 16, 17 and 14, 15. The respective attachment of parts 12 and 13 is made possible through a flexible rectangular plate 20 provided at its two ends with two slots 21 and 22 adapted to be placed in circular grooves 23 and 24 provided on the periphery of heads 18 and 19.

The inner side of support member 1 adapted to directly engage the shoulder may present a rough surface, for instance a serrated surface in the vicinity of end portions 29 and 30 so that the friction on the shoulder provides an easy fit, while preventing the clothes from suffering undue wear. Adjacent end portion 2 and on both sides of the support member are provided two blind holes 31 and 32 adapted to accommodate a safety rod 33 formed with a curved portion 34 adapted to apply against the neck of the user and ensuring thereby the maintenance of the support member in conversation position when the user inclines his bust forwards.

Before securing the clamp onto the support member, it is necessary to place the telephone handset between the two jaws, then insert the support heads into the holes of the clamp, and place the flexible plate between the two grooves formed on the heads of the rods for the support, while pressing slightly down the middle portion of the plate.

Figure 9:
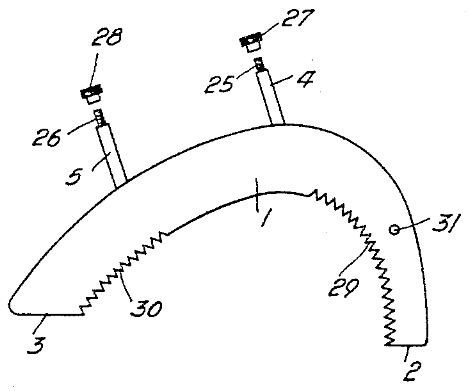
FIG. 9 is a side view of an alternate embodiment of the support.

It will be noted that at this moment the clamp is locked onto the support in closed position, resulting in the clamping of the handset in the desired position. It will also be noted that rods 4 and 5 may also be threaded as illustrated at 25 and 26 in FIGURE 9, the positioning of the clamp being assured, in this case, by means of threaded caps 27 and 28.

The device according to the invention may be used for any of the shoulders of the user. When it is desired to switch over from one shoulder to the other, it is merely necessary to unlock the clamp, to turn the handset 180°, to relock the clamp, and to withdraw the safety rod from one hole in the back of the support member and to reposition it in the opposite hole.

It should be understood that the device is in no way limited to the embodiments described and represented, which may undergo modifications and variations within the scope and limits of the following claims.

What I claim is:

1. A device for holding in use a telephone handset having an earphone and a mouthpiece comprising an arcuate support member adapted to rest on and adapted to the shape of a shoulder of the user, opposite longitudinal ends of the member being wider than a middle portion thereof and being depressed with respect to the middle portion, post means rising from the middle portion of the member and first and second opposed clamping plates mounted on the post means remote from the support member, the clamping plates being adapted to hold the handset with the mouthpiece and earphone adjacent vicinities of a user's mouth and ear, respectively.

2. A device according to claim 1, in which said support is made of a light and rigid plastic material.

3. A device according to claim 1, in which said support member has a serrated underface.

4. A device according to claim 1, in which said support member is provided with a safety rod extending from a side thereof, said safety rod comprising an arcuate portion adapted to engage the back part of the user's neck.

References Cited

UNITED STATES PATENTS

| | | | |
|---|---|---|---|
| 2,552,906 | 5/1951 | Paul | 179—157 |
| 3,176,087 | 3/1965 | Schetzer | 179—157 |

WILLIAM C. COOPER, *Primary Examiner.*

JAN S. BLACK, *Assistant Examiner.*